(12) United States Patent
Chandar

(10) Patent No.: US 9,769,270 B2
(45) Date of Patent: *Sep. 19, 2017

(54) TECHNIQUES FOR ENHANCING A MEMBER PROFILE WITH A DOCUMENT READING HISTORY

(71) Applicant: LinkedIn Corporation, Mountain View, CA (US)

(72) Inventor: Vinoth Chandar, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 14/623,694

(22) Filed: Feb. 17, 2015

(65) Prior Publication Data

US 2015/0163313 A1    Jun. 11, 2015

Related U.S. Application Data

(63) Continuation of application No. 13/674,694, filed on Nov. 12, 2012, now Pat. No. 8,977,687.

(51) Int. Cl.
| | | |
|---|---|---|
| *G06F 15/16* | (2006.01) | |
| *H04L 29/08* | (2006.01) | |
| *G06Q 10/10* | (2012.01) | |
| *G06Q 50/00* | (2012.01) | |
| *G06F 9/54* | (2006.01) | |
| *G06F 12/00* | (2006.01) | |

(52) U.S. Cl.
CPC ............ *H04L 67/22* (2013.01); *G06F 9/543* (2013.01); *G06Q 10/10* (2013.01); *G06Q 50/01* (2013.01)

(58) Field of Classification Search
CPC .......... G06Q 50/01; G06Q 10/063112; G06Q 10/1053; G06Q 10/06; G06Q 50/00; G06Q 30/02; G06Q 10/067; G06Q 10/10; G06Q 10/00; G06Q 10/063118; G06Q 10/0635; G06Q 10/06398; G06Q 10/105; G06Q 10/107; G06Q 10/1095; G06Q 30/00
USPC ......................... 709/203, 204, 223–229, 250
See application file for complete search history.

(56) References Cited

U.S. PATENT DOCUMENTS

| | | | |
|---|---|---|---|
| 7,730,216 B1 | 6/2010 | Issa et al. | |
| 8,977,687 B2 * | 3/2015 | Chandar ................ | G06Q 50/01 709/204 |
| 2009/0157677 A1 | 6/2009 | Beaver et al. | |
| 2011/0191417 A1 | 8/2011 | Rathod | |

(Continued)

OTHER PUBLICATIONS

"About Diigo", [Online]. Retrieved from the Internet: <URL: www.diigo.com/about>, (Accessed Oct. 23, 2012), 4 pgs.

(Continued)

*Primary Examiner* — Zarni Maung
(74) *Attorney, Agent, or Firm* — Schwegman Lundberg & Woessner, P.A.

(57) ABSTRACT

Disclosed in some examples is a method of providing a bookmarking service on a social networking service, the method including receiving, over a network, an indication that a member of the social networking service interacted with an item of content; associating the item of content with a skill using a computer processor; and storing an indication in a storage device that the member interacted with the item of content and the skill associated with the item of content.

18 Claims, 9 Drawing Sheets

(56) References Cited

U.S. PATENT DOCUMENTS

| | | |
|---|---|---|
| 2012/0089914 A1 | 4/2012 | Holt et al. |
| 2013/0291079 A1 | 10/2013 | Lowe et al. |
| 2014/0136546 A1 | 5/2014 | Satalkar et al. |
| 2014/0136613 A1 | 5/2014 | Chandar |

OTHER PUBLICATIONS

"U.S. Appl. No. 13/674,694, Notice of Allowance mailed Nov. 24, 2014", 15 pgs.

"U.S. Appl. No. 13/674,694, PTO Response to Rule 312 Communication mailed Feb. 11, 2015", 2 pgs.

"CiteULike: Frequently Asked Questions", [Online]. Retrieved from the Internet: <URL: http://www.citeulike.org/faq/faq.adp>, (Accessed Oct. 23, 2012), 4 pgs.

"Digg—Wikipedia", [Online]. Retrieved from the Internet: <URL: http://en.wikipedia.org/wiki/Digg>, (Accessed Oct. 23, 2012), 16 pgs.

"Diigo Help: Bookmarking", [Online]. Retrieved from the Internet: <URL: help.diigo.com/how-to-guide/bookmarking>, (Accessed Oct. 23, 2012), 2 pgs.

"Diigo—Web Highlighter and Sticky Notes, Online Bookmarking and Annotation, Personal Learning Network", [Online]. Retrieved from the Internet: <URL: www.diig.net>, (Accesssed Oct. 23, 2012), 3 pgs.

"Odysci", [Online]. Retrieved from the Internet: <URL: http://www.odysci.com/>, (Accessed Oct. 23, 2012), 1 pg.

"Odysci: How it Works", [Online]. Retrieved from the Internet: <URL: http://www.odysci.com/how-it-works>, (Accessed Oct. 23, 2012), 8 pgs.

"Reddit: Frequently Asked Questions", [Online]. Retrieved from the Internet: <URL: http://www.reddit.com/help/faq>, (Accessed Oct. 23, 2012), 8 pgs.

"What is StumbleUpon?", [Online]. Retrieved from the Internet: <URL: http://www.stumbleupon.com/about>, (Accessed Oct. 23, 2012), 1 pg.

Ackerman, Mark, "Sharing Expertise: Beyond Knowledge Management", The MIT Press (Cambridge, Massachusetts), (2003), 438 pgs.

Becerra-Fernandez, Irma, "Searching for Experts on the Web: A Review of Contemporary Expertise Locator Systems", ACM Transactions on Internet Technology 6(4), (Nov. 2006), 333-355.

D'Amore, Raymond, "Expertise Community Detection", SIGIR, (Jul. 25-29, 2004), 498-499.

Dom, Byron, et al., "A Bayesian Technique for Estimating the Credibility of Question Answerers", SIAM, (2008), 399-409.

Dom, Byron, et al., "Graph-Based Ranking Algorithms for E-mail Expertise Analysis", DMKD, (Jun. 13, 2003), 42-48.

Fu, Yupeng, et al., "Finding Experts Using Social Network Analysis", IEEE/WIC/ACM International Conference on Web Intelligence, (2007), 77-80.

Grolmus, Petr, et al., "A Web-Based User-Profile Generator: Foundation for a Recommender and Expert Finding System", 8th ICCC International Conference on Electronic Publishing, (Jun. 2004), 331-342.

Guo, Hui, et al., "TopicMark: A Topic-focused Bookmark Service for Porfessional Groups", [Online]. Retrieved from the Internet: <URL: http://www.ercim.eu/publication/ws-proceedings/DELOS6/hui.pdf>, (Accessed Oct. 23, 2012), 9 pgs.

Haselmann, Till, et al., "Towards a Conceptual Model for Trustworthy Skills Profiles in Online Social Networks", ERCIS, (2010), 13 pgs.

Huh, Eui-Nam, et al., "A Framework of Online Community based Expertise Information Retrieval on Grid", Kyung Hee University Memo, (Aug. 11, 2008), 21 pgs.

Huh, Eui-Nam, et al., "A Framework of Online Community based Expertise Information Retrieval on Grid", Kyung Hee University Memo, (Jan. 14, 2010), 21 pgs.

John, Ajita, et al., "Collaborative Tagging and Expertise in the Enterprise", WWW2006, (May 22-26, 2006), 6 pgs.

Li, Juanzi, et al., "EOS: Expertise Oriented Search Using Social Networks", WWW 2007 / Poster Paper, (May 8-12, 2007), 1271-1272.

Malek, Maria, et al., "Exhaustive and Guided Algorithms for Recommendation in a Professional Social Network", EISTI-Laris laboratory, PRES Cergy University, (Jul. 31, 2010), 19 pgs.

Meyer, Bertolt, et al., "skillMap: dynamic visualization of shared organizational context", Institute of Information Systems, Humboldt University Berlin, (Feb. 20, 2006), 13 pgs.

Pretschner, Alexander, "Ontology Based Personalized Search", Department of Electrical Engineering and Computer Science, University of Kansas, (1998), 125 pgs.

Stankovic, Milan, et al., "Looking for Experts? What can Linked Data do for you?", LDOW, (Apr. 27, 2010), 10 pgs.

Tang, Jie, et al., "ArnetMiner: An Expertise Oriented Search System for Web Community", International Semantic Web Conference—ISWC, (2007), 8 pgs.

Yimam-Seid, Dawit, et al., "Expert Finding Systems for Organizations: Problem and Domain Analysis and the DEMOIR Approach", Journal of Organizational Computing and Electronic Commerce 13(1), (2003), 1-24.

Zhang, Jing, et al., "Expert Finding in a Social Network", Department of Computer Science and Technology, Tsinghua, University Database Systems for Advanced Applications—DASFAA, (2007), 1066-1069.

\* cited by examiner

TECHNIQUES FOR ENHANCING A MEMBER PROFILE WITH A DOCUMENT READING HISTORY

RELATED APPLICATIONS

This application is a continuation of U.S. patent application Ser. No. 13/674,694, filed on Nov. 12, 2012, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIN, All Rights Reserved.

BACKGROUND

A social networking service is a computer or web-based application that enables users to establish links or connections with persons for the purpose of sharing information with one another. Some social networks aim to enable friends and family to communicate with one another, while others are specifically directed to business users with a goal of enabling the sharing of business information.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 shows a screenshot according to some examples of the present disclosure.

FIG. 5 shows a screenshot according to some examples of the present disclosure.

FIG. 7 shows a screenshot according to some examples of the present disclosure.

DETAILED DESCRIPTION

Figure 1A:
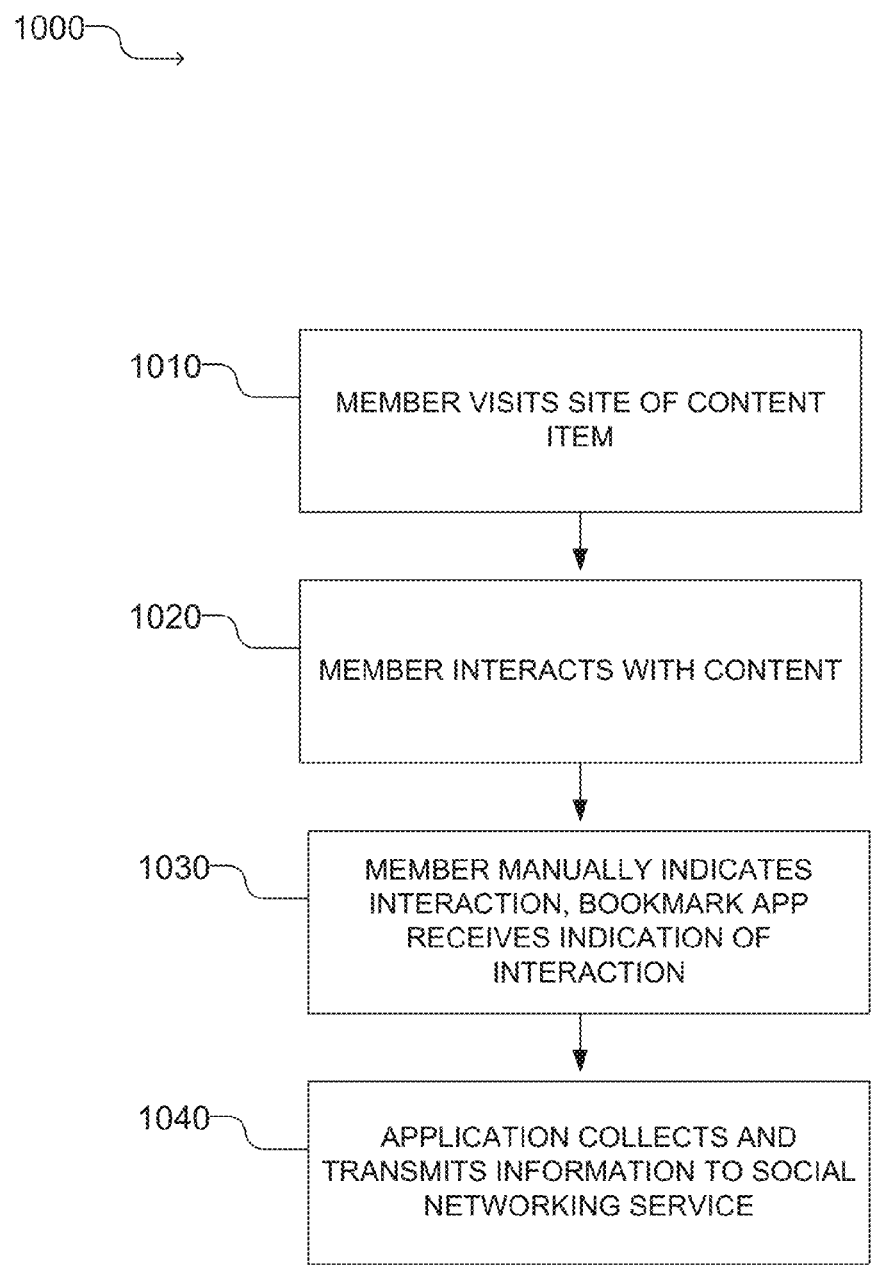
FIG. 1A shows a flowchart of a method of determining the content items interacted with by members according to some examples of the present disclosure.

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service. A social networking service is an online service, platform or site that allows members to build or reflect social networks or social relations among members. Typically, members construct profiles, which may include personal information such as name, contact information, employment information, photographs, personal messages, status information, links to web-related content, blogs, and so on. Typically, only a portion of a members profile may be viewed by the general public, and/or other members.

The social networking site allows members to identify, and establish links or connections with other members in order to build or reflect social networks or social relations among members. For instance, in the context of a business or professional networking service (a type of social networking service), a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member then has the option of accepting or declining the invitation.

In general, a connection or link represents or is otherwise associated with an information access privilege, such that a first person who has established a connection with a second person is, via the establishment of that connection, authorizing the second person to view or access non-publicly available portions of their member profiles. Of course, depending on the particular implementation of the business/social networking service, the nature and type of the information that may be shared, as well as the granularity with which the access privileges may be defined to protect certain types of data may vary greatly.

The growth of social networks means that many people spend a lot of time logged into social networks. This makes the social networking service an ideal platform for the storage of important user information. For example, the member may wish to have a centralized location to store important user data that then may be shared (on a limited or unlimited basis) with other members. For example, a member may wish to save links and information on content items they are interested in. These "bookmarks" may enable users to quickly navigate to content that is of interest, among other uses.

Disclosed in some examples are methods, systems, and machine-readable media which provide a bookmarking service associated with a social networking service. Members of the social networking service may create bookmarks of various items of content that they interact with on the Internet or another computer network. These bookmarks may then be available to the user at the social networking site to allow convenient access to these content items. These bookmarks may also be shared with other members, including connections. For example, a member may wish to see what content a connection has been interacting with, or get recommended content items.

These bookmarks may also tie into other features of the social networking service. For example, some social networks create skill communities, which consist of a group of members who the system recognizes as possessing certain skills. The social networking services implementing these skill communities may automatically create a list of skills based on information in the profile's of its members. Once the list of available skills is created, the system may group members into skill communities based upon self reporting of skills, skills inferred by the system based upon information in member profiles, or both. In some examples, the bookmarks may be tied into these skill communities. For example, when a user bookmarks a particular item of content, the system may analyze the item of content and automatically associate one or more of the skills from the list of skills to that content item based on a likelihood that the content item is related to a topic in that skill. The bookmarks may then be used as signals to determine things such as one or more of: potential skills a member is interested in, a skill interest level, a skill aptitude, or the like.

The formation and use of such skill communities is described in U.S. patent application Ser. No. 13/357,171 filed on Jan. 24, 2012 to Skomoroch et. al and entitled "SKILL EXTRACTION SYSTEM," which is hereby incorporated by reference in its entirety. This application describes the formalization of a standardized list of skills from information in member profiles including free text descriptions of skills. Also describing formation and use of skill communities includes U.S. patent application Ser. No. 13/357,302 filed on Jan. 24, 2012 to Skomoroch et. al. and entitled "SKILL RANKING SYSTEM," which is hereby incorporated by reference in its entirety, and U.S. patent application Ser. No. 13/357,360 filed on Jan. 24, 2012 to Skomoroch et. al. and entitled "SKILL CUSTOMIZATION SYSTEM," which is hereby incorporated by reference in its entirety. Suggesting a skill based upon information inferred from a member's profile is described in U.S. patent application Ser. No. 13/629,241 filed on Sep. 27, 2012 to Bastian, et al. entitled "Inferring and Suggesting Attribute Values for a Social Networking Service," which is hereby incorporated by reference in its entirety.

The association between the content the user is interested in and the skills those members possess allows the system to enhance the social networking experience in a variety of ways. For example, the system may present article recommendations for members with a certain skill based on popular articles associated with that skill that other members have bookmarked. The system may sort a user's bookmarks by skill for enhanced organization of the bookmarks. In some examples, the system may even tailor the skills experience by increasing a member's skill ranking based on information about the content they interact with. In yet other examples, the information may allow the system to foster increased adoption of skill communities by suggesting a member add a skill to their profile based on their content interests, or the like.

Both manual and automatic collection of information regarding the content members are interacting with is contemplated. For descriptive convenience the term "bookmarking" may refer to both manual examples where members indicate their interactions with the content item manually (e.g., clicking on a bookmark button)—and examples in which the system automatically reports interactions of members with the content items without explicit user intervention. The term "bookmark" may refer to the information collected about the member's interaction with the content.

Content items may be or include: articles, technical journals, websites, videos, presentations, streaming content, audio content, or the like. Content items may be any portion of content which may contain information related to a particular skill. Content items may be interacted with in a variety of ways including reading, commenting on, writing, posting, viewing, listening, highlighting, copying, pasting, or the like.

A bookmark may be or include bibliographic information such as title, author, publisher, and information on how to locate the content item. For example, the bookmark may include a Uniform Resource Identifier (URI), a Uniform Resource Locator, or both. This location information may allow for the easy access of that content (e.g., through a hyperlink) later. Bookmarks may be sorted (e.g., sorted by skill, by date, by time, by member, or the like), shared with other members (e.g., a social bookmark), rated, commented upon, or the like. In some examples the bookmarks may only be shared with a member's connections, in other examples the bookmarks may only be shared with other members with skills identified in their profiles that match skills associated with the content item. In other examples the bookmarks may only be shared by connections that have skills identified in their profiles that match skills associated with the content item.

The system may receive information on content interacted with by members in a number of different ways. In some examples, the system may receive this information from an application the member installs. This application may take many forms. However, for ease of description, the application which executes on the client side, regardless of form, may be referred to herein as the bookmark application.

In one example the bookmark application may take the form of a "reader application." A reader application (or "app") may be an application integrated into a browser which may generate an alternative presentation of the content displayed by the browser. The presentation of the reader app is typically a cleaner form without banner ads, extraneous text, or other distractions that may be present on the browser's content presentation. The content presentation provided by the reader app may be selected through an option in the browser. In some examples, the social networking service may provide a reader app which may automatically send information on the content items to the social networking service, may prompt the user automatically to ask if they want to send information on content items they are interacting with to the social networking service, or contain an integrated button or other option that allows users to easily send the content information to the social networking service.

In other examples, the bookmark application may take the form of a "bookmark let app." In some examples, a bookmarklet app may be a JavaScript that may be executed by clicking a browser bookmark. In other examples, the bookmark application may be a browser plug in, which may add an option in the browser which may allow users to explicitly send the content information to the social networking service. For example, the bookmark app may take the form of a toolbar which may appear anywhere on the browser or webpage and allow users to click on it to bookmark the content. In yet other examples, the bookmark application may be a standalone app—independent of the browser, which may execute any of the aforementioned functionality associated with the reader or the bookmark let app.

By bookmarking the content the bookmark app sends the content information to the social networking service. In some examples, the bookmark application may automatically send information on the content items to the social networking service or may prompt the user automatically to ask if they want to send information on the content items they are interacting with to the social networking service.

In still other examples, the bookmark application may be the browser itself, which may communicate with the social networking service to allow the social networking service to obtain the member's browsing history when the member visits the social networking service. The system may analyze those content items that have been visited since the user last visited the social networking service. In some examples, internet browsers may not support transferring browsing history to an internet site, in which case a browser plug-in may be offered to members in order to enable this functionality.

In some examples, the bookmark application may attempt to validate that the user has actually interacted with a particular piece of content (as opposed to simply visiting the URL of the content). For example, the bookmark application may only record, or allow a member to record that a particular content item was read if that particular content item was open on the user's computing device for a threshold amount of time. In further examples, the threshold may be adjusted based upon the size of the content item. Thus the threshold may be adjusted so that longer articles require larger time amounts spent viewing the content item in order to be considered "read" or otherwise interacted with. This may be implemented in order to prevent members from cheating by visiting a number of sites but not actually interacting with the content to inflate their social status. Other forms of validation may be utilized. For example, the browser may detect whether or not a user has scrolled to the bottom of the page on which the content item is displayed, or clicked on links to request multiple pages of a multiple page content item. In other examples, other types of content may also have these thresholds. For example, for video or audio content, the system may require playback of a certain threshold percentage of the content.

Once the information about the various content items interacted with by members reaches the social networking service, the social networking service may determine which skills the content item relates to by using automatic analysis. For example, the text of an article may be automatically analyzed to determine which skills the article relates to.

In one example method, a set of training articles may be manually tagged with associated skills. These articles may then be analyzed to determine important keywords associated with the tagged skills. For example, a term-inverse document frequency (tf-idf) may be computed for each term in the document. The tf-idf is a numerical statistic which reflects how important a word is to a document in a collection or corpus. The tf-idf value increases proportionally to the number of times a word appears in the document, but is offset by the frequency of the word in the corpus. In this example, the tf-idf ranks how important certain terms are to the corpus of documents manually tagged with a particular skill. For example, the system may save the top 50 terms as determined by tf-idf and the training data. These top 50 terms would be expected to show up in an article or other content item associated with the tagged skill.

This training data may then be used when comparing a new article that is not already tagged. For example, the system may count each term in a new article to determine the top terms in the article. These top terms may then be compared with top terms associated with skills in the system. If enough of the top terms in the content item appear in the top terms associated with the skills in the system (e.g., above a threshold value or percentage) the content item may be tagged with that skill. An article may be tagged with more than one skill.

Other classification algorithms may be used to automatically associate content items with skills, for example, expectation maximization algorithms, naïve Bayes classifiers, latent semantic indexing, support vector machines, artificial neural networks, K-nearest neighbor algorithms, or the like.

Once a document has been associated with a particular skill, the training data (e.g., the top terms associated with an algorithm) may be updated to reflect the new information. Thus the system may adapt to changes in the terminology used in the skill or interest as it changes over time. Once a particular document is tagged with skills, the system may store information on the document (URL and/or other bibliographical information) and subsequent accesses by other members will not cause the system to retag the document. The system may also incorporate member feedback about the skill associations. For example, a member may indicate that a particular content item is not related to a particular skill. This information may then be used to adjust the weight of the particular terms used in the content item.

In other examples, the system may determine the set of skills to associate with the content item by considering the skills of the members who are interacting with that content item. Skills that have a high number of members with that skill interacting with that content item may be associated with that content item. For example, if a particular video was heavily interacted with by members who have a computer programming skill, the video may be associated with the computer programming skill. In this way, the unique data of the social networking service may allow for the classification of the content item without actually basing the classification on the actual content of the content item.

The bookmarks and the skills associated with those items may be used in a variety of ways to enhance the social networking system. For example, the member may see a history of all the bookmarks and the skills associated with those items. The member may be able to sort the bookmarks by skills. Additionally, various statistics may be presented to the member, such as the percentage of content that relate to a particular skill or the like. This information may also use, and have implications on, data of other members who share similar skills. For example, the member may be able to see, or be recommended, the top or recently trending content items for specific skills.

The information may be used to generate a composite score of the person which may indicate the member's scholarly activity. This score may then be displayed to the member along with comparison information to give the member a sense of how they rate compared with other members of the skill.

The information may be used to assist recruiters in finding qualified job applications that meet their needs. For example, the recruiter may see the list of content items the member has viewed recently and the skills associated with those content items. The recruiter may be able to filter candidates based on their proficiency for viewing content related to one or more skills of interest. For example, the recruiter may search for candidates whose composite scores are above a specified threshold in one or more skills.

The information may also be used in the skill ranking algorithms as a signal. In these examples, a user's proficiency in a particular skill may be adjusted up or down based upon their proficiency in interacting with content associated with that skill. The information may also be used to suggest skills to members. For example, if a member is heavily interacting with content associated with a particular skill yet the member has not added that skill to their profile, the system may suggest that they add the skill to their profiles.

In some examples, the composite score of the member (which is a signal of their scholarly activity) may be used to determine endorsement strength. In some social networks, members may endorse the skills of other members. The endorsement is an affirmation that the endorsee member has that skill. The endorsements may also be signals into how well a person knows a skill (e.g., the more endorsements the more likely the person has the skill) However, each endorsement may be weighted such that endorsements that come from individuals who have higher composite scores (e.g., interact with more content in that skill area) may count more than endorsements from lower scoring members.

Turning now to FIG. 1A, an example method 1000 of determining the content items interacted with by members is shown. In this example, the member downloads a bookmark application (e.g., a plug-in, a reader application, or the like) on their computing devices which allows them to manually indicate which content items they have been interacting with. Once the application or plug-in is installed, the member may visit the internet URL of the content item, or otherwise load a content item into memory of their computing device (e.g., the application may allow for tracking more than web based content) at operation 1010. At operation 1020 the member may interact with the content. As previously described the interaction may include reading content, viewing content, listening to content, authoring content, commenting on the content, or any combination thereof. At operation 1030 the member may manually indicate the interaction with the content (e.g., bookmark the content) and the bookmarking app receives this indication. The application may record bibliographic information (e.g., author, title, URL, or the like) about the content, or may record the content itself (or a portion of it). This information (bibliographic information, content, or both) may be transmitted to the social networking service at operation 1040. As previously explained, in some examples the application may also have operations that implement basic validity checking on the member's assertion that they have interacted in particular ways with the content. For example, if the member is asserting that they have read the content, the application may verify that the member has had the item on their screen for a particular threshold amount of time.

Figure 1B:
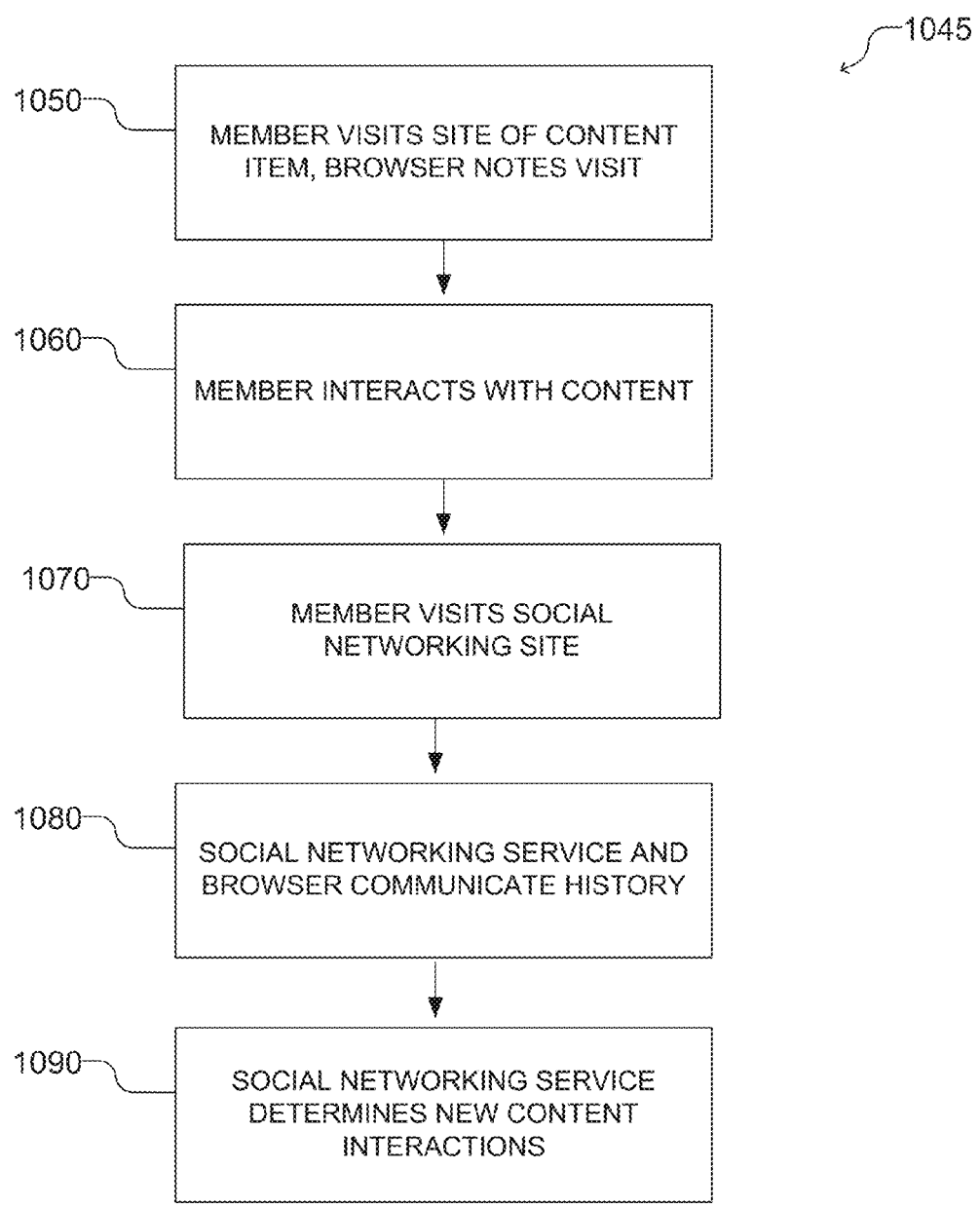
FIG. 1B shows a flowchart of a method of determining the content items interacted with by members according to some examples of the present disclosure.

Turning now to FIG. 1B, another example method 1045 of obtaining interaction information is shown. In this example, the bookmarks (e.g., the information on the content interactions) are automatically created. At operation 1050 the member visits a particular internet site displaying the content item. At operation 1060 the member interacts with that content. By visiting the internet site and by interacting with the content, the member's internet browser may store a history of that visit (or as previously described, a member's browser may have a plug-in or other application that facilitates this). At operation 1070, the user may visit the social networking site. At operation 1080, the social networking service may communicate with the browser to download the browser's history. At operation 1090 the social networking service may determine from the browser history and any past history which content items have been interacted with since the last visit to the social networking service at operation 1090. While the example shown in FIG. 1 downloaded the browser's history upon the user's visit to the social networking service, in other examples this may occur at a predetermined time, or a predetermined interval and not require an explicit visit to the social networking service.

Figure 2:
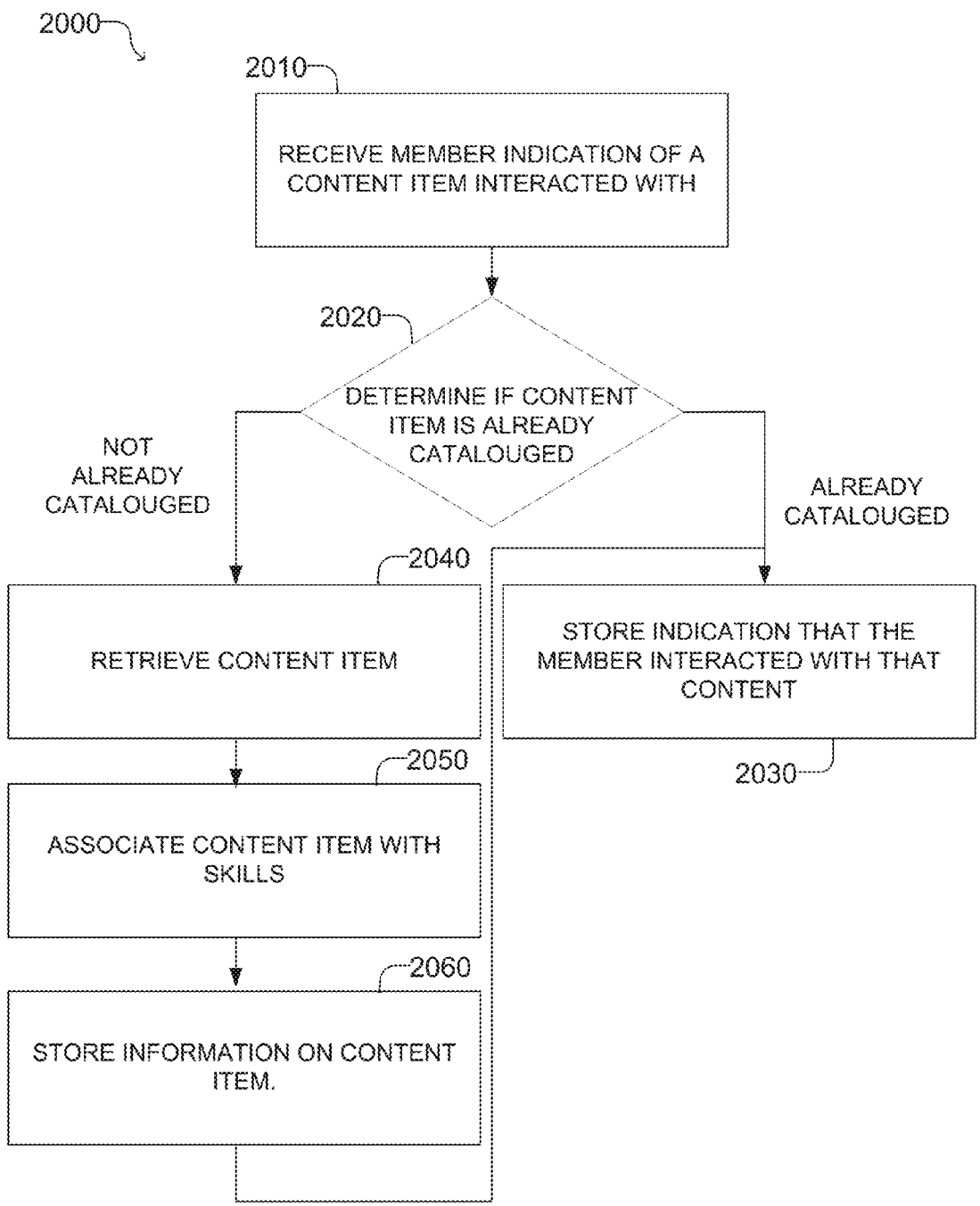
FIG. 2 shows a flowchart of a method of providing a bookmarking service on a social networking service according to some examples of the present disclosure.

Turning now to FIG. 2 an example method 2000 of a bookmarking service operating on a social networking service is shown. At operation 2010 the service may receive an indication from a member that a new item of content was interacted with. The service may also receive information about that content (e.g., bibliographic information). At operation 2020 the social networking service uses the content information, and in some examples, the content (or a sample of the content) which was sent by the user in operation 2010 to determine if the social networking service has already identified skills associated with that content at operation 2020. If the social networking service has already identified the skills associated with that content, then the social networking service stores an indication that the particular member interacted with the content and the skills associated with the content at operation 2030. In one example, this may be indicated in the member's profile. If the content item is not already associated with skills, the social networking service may retrieve the content item at operation 2040 (unless it was already provided by the user at operation 2010). At operation 2050 the various skills may be associated with the content item as previously described. At operation 2060 the information regarding the content item and the skills which are associated with that content item may be stored in a data store of the social networking service. Once the article is associated with those skills, the system may store an indication (as previously discussed) that the member interacted with the content at operation 2030.

Figure 3:
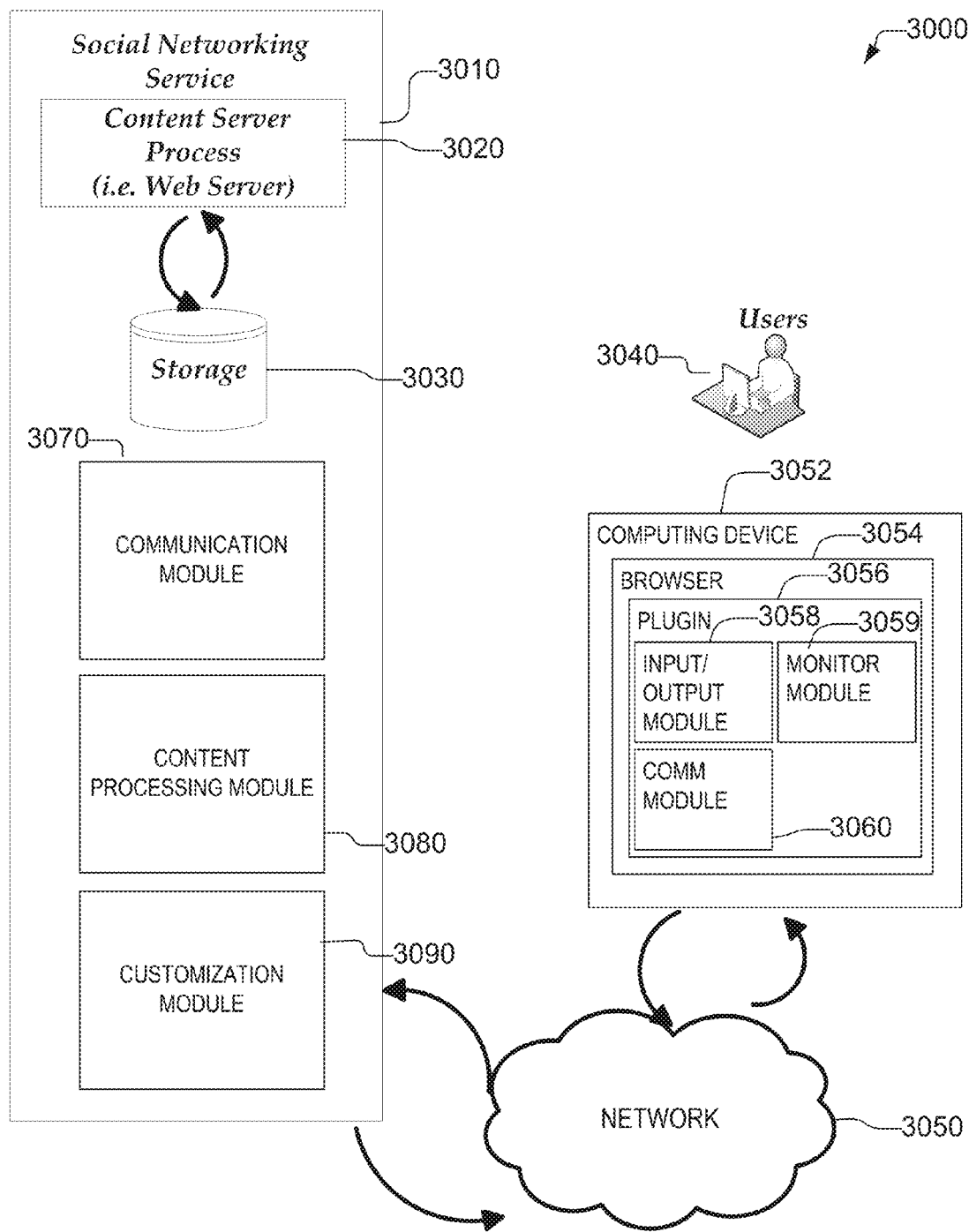
FIG. 3 shows a schematic of a social networking system and computing devices according to some examples of the present disclosure.

FIG. 3 shows an example system 3000 for providing a social networking service and for providing content bookmarking features. Social networking service 3010 may contain a content server process 3020. Content server process 3020 may communicate with storage 3030 and may communicate with one or more users 3040 through a network 3050. Content server process 3020 may be responsible for the retrieval, presentation, and maintenance of member profiles stored in storage 3030. Content server process 3020 in one example may include or be a web server that fetches or creates internet web pages. Web pages may be or include Hyper Text Markup Language (HTML), eXtensible Markup Language (XML), JavaScript, or the like. The web pages may include portions of, or all of, a member profile at the request of users 3040.

Users 3040 may include one or more members, prospective members, or other users of the social networking service 3040. Users 3040 may access social networking service 3010 through network 3050 using a computer system or device 3052. The network may be any means of enabling the social networking service 3010 to communicate data with users 3040. Example networks 3050 may be or include portions of: the Internet, a Local Area Network (LAN), a Wide Area Network (WAN), wireless network (such as a wireless network based upon an IEEE 802.11 family of standards), a Metropolitan Area Network (MAN), a cellular network, or the like.

Users may access the features of the social networking device and take advantage of the bookmarking features through computing device 3052. Computing device 3052 can be any computing device including mobile devices such as smartphones, tablet computing devices, laptops, desktops, servers, or any other electronic device capable of communicating with content server process over network 3050. The computing device 3052 may execute a browser 3054 which may load and display web pages, such as those delivered from content server process 3020 of social networking service. Computing device 3052 may also contain a bookmark application. In some examples, this application may take the form of a browser plugin, script, or other code module executing within browser 3054. For example, plug-in or script 3056. Plug-in or script 3056 may include features which enable the skills bookmarking features described herein. For example, plug-in 3056 may include an input/output module 3058. Input/output module 3058 may display one or more prompts on the display and receive user input from a user which may allow users to enter input which may report one or more content items interacted with. In some examples, the plug-in 3056 may contain a monitoring module 3059 which may automatically monitor the user's browsing history and periodically transmit the information on content the user has interacted with to the communication module 3070 of social networking service through communication module 3060 of the plugin 3056. Communication module 3060 of plugin 3056 may communicate with communication module 3070 of social networking service 3010 to transfer information on content items. While the modules 3058, 3059, or 3060 are shown as part of plugin or script 3056, in other examples, the functionality of these modules may be executed by browser 3054. For example, communication module 3070 may directly receive the browsing history through one or more communications with browser 3056. In other examples, the computing device 3052 may implement the social bookmarking features through an application which is independent of the browser and plug-in. This application may implement the functionality of display module 3058, monitoring module 3059 and communication module 3060. In some examples the application, browser, or plugin may have all of the modules 3058, 3059, and 3060, but in other examples, the application, browser, or plugin may have only a subset of those modules.

Communication module 3070 may communicate with communication module 3060 of plugin 3056 or the stand alone application through network 3050. The communication module may receive one or more reports of content items that were interacted with by various members. These reports may include all of, or portions of, the content, bibliographic information (in some examples, including a URI or URL), and member information identifying the member. In other examples the communication module 3070 may receive a browser history and may determine (based on previously stored information in the storage 3030) which content is newly visited. Once these reports are received, the newly interacted-with content is passed to the content processing module where it is determined if the content is associated with skills. If the content is not already associated with skills, the content is then associated with skills. If the content is already associated with skills the skills that are associated with the content may be retrieved from storage 3030. The skills that are associated with the content as well as the information on the content may be stored in the storage 3030 and associated with the member.

Customization module 3090 may provide one or more customization features based on the content identified as interacted with by the user or system. For example, the customization module 3090 may create pages on the social networking service which may show a member the content they interacted with, alter skill rankings and ratings, create skill bookmarking statistics for presentation to various users (e.g., top content items by skill, content recommendations based on member skills, or the like), or implement other customization features.

Figure 4:
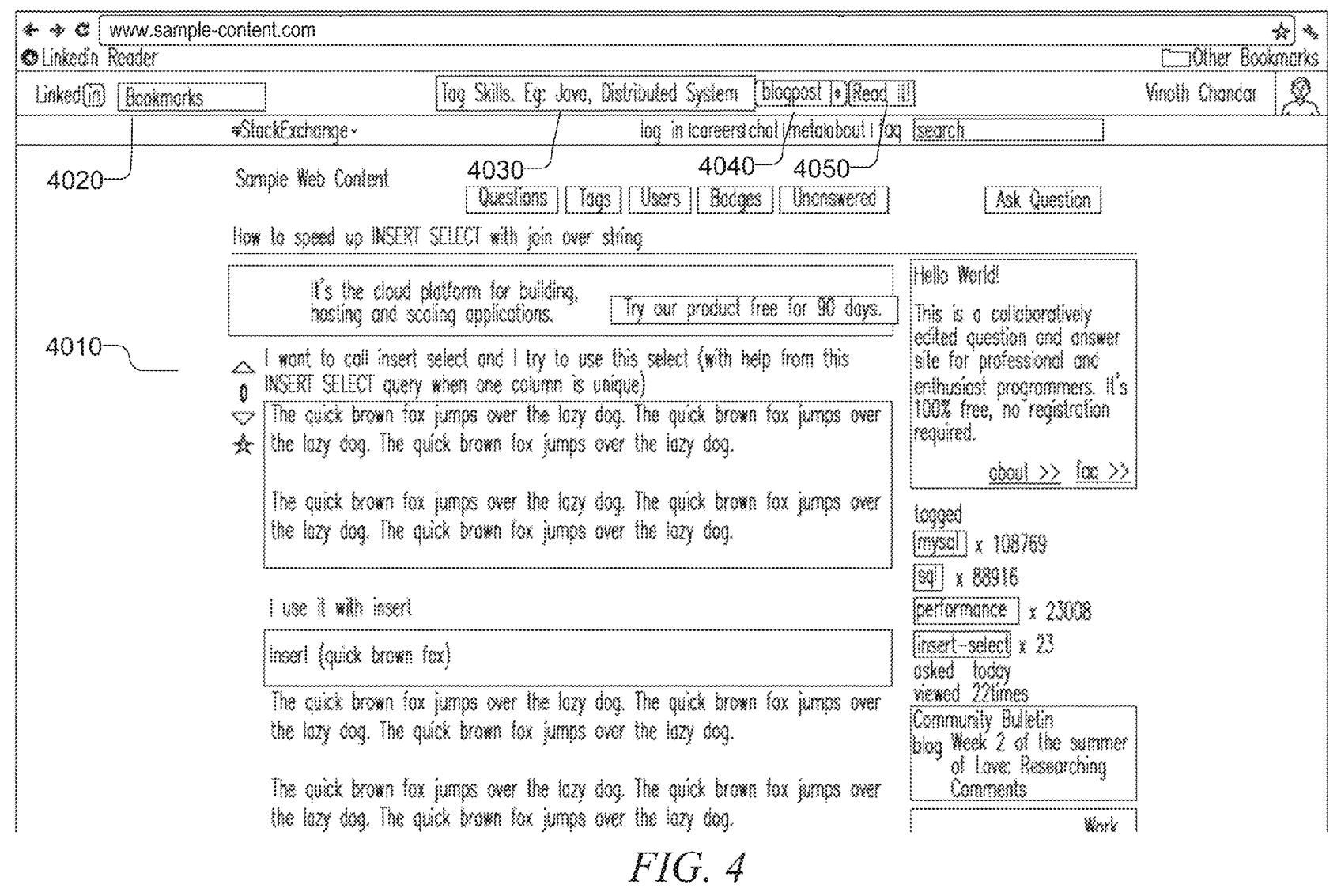

Turning now to FIG. 4 an example of a bookmarklet app 4020 is shown overlaid over a browser window displaying an item of content 4010. The app toolbar may include a text entry box 4030 that members may use to manually tag skills to the items of content, or the text box 4030 may be static and may show the skill association (e.g., the bookmarklet app may communicate the information on the content item with the social networking service to retrieve the social networking service's skill association to preview this to the user before they decide to bookmark it). The drop down box 4040 may allow users to categorize the bookmark based on type of content or some other criteria. This may allow for user categorization later. The "read it" button 4050 may be clicked when the user wishes to save this as a bookmark.

Figure 5:
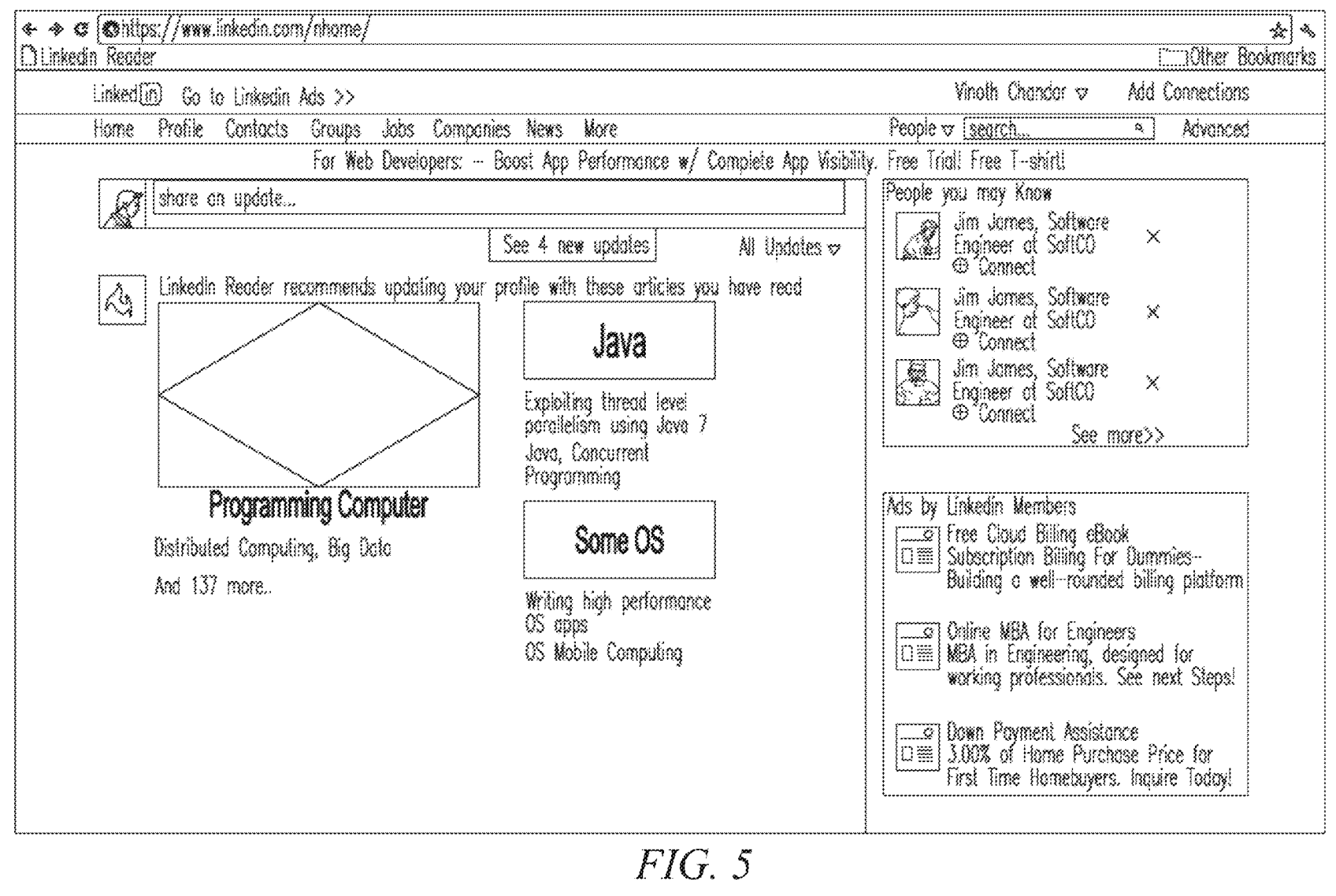

FIG. 5 shows a screenshot of an example confirmation screen which allows members to confirm that they have actually interacted with the content. This may be particularly useful for the automatic collection examples, but may also be used for examples in which the user manually indicates that they have interacted with particular items of content.

Figure 6:
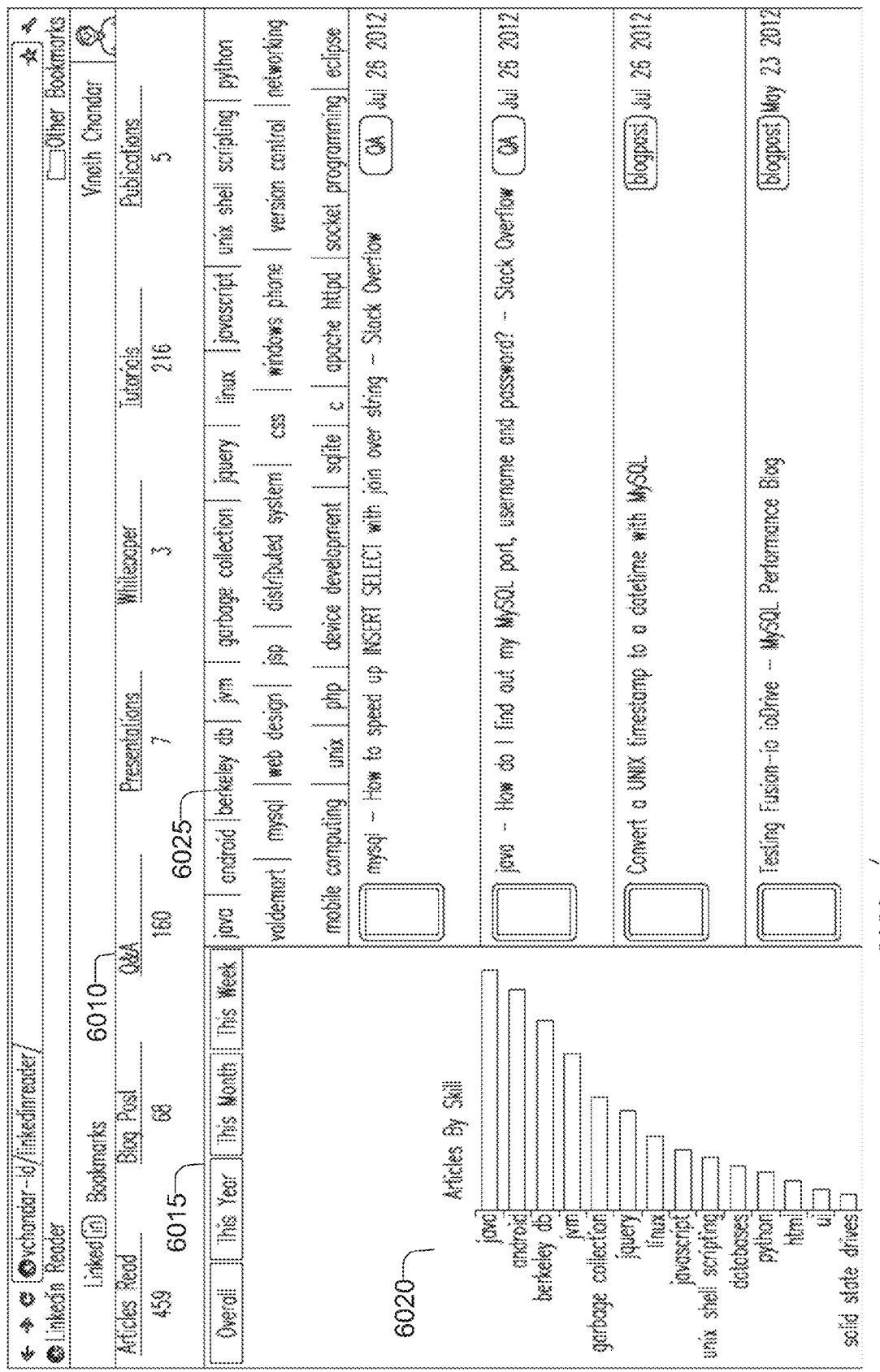
FIG. 6 shows a screenshot according to some examples of the present disclosure.

FIG. 6 shows a screenshot of an example bookmark page on the social networking service. It shows various statistics 6010 showing the total number of content items interacted with, blog posts read, Q&A read, presentations read, whitepapers read, tutorials and publications read, and the like. This can be filtered by time (overall, this year, this month, this week) using buttons 6015. The screenshot shows a bar graph 6020 showing the content items by skill (e.g., content items relating to the Java skill are the most frequently interacted with). In addition, the various skills of the articles may appear as tabs 6025 which when selected display the content items associated with those tabs 6030.

Figure 7:
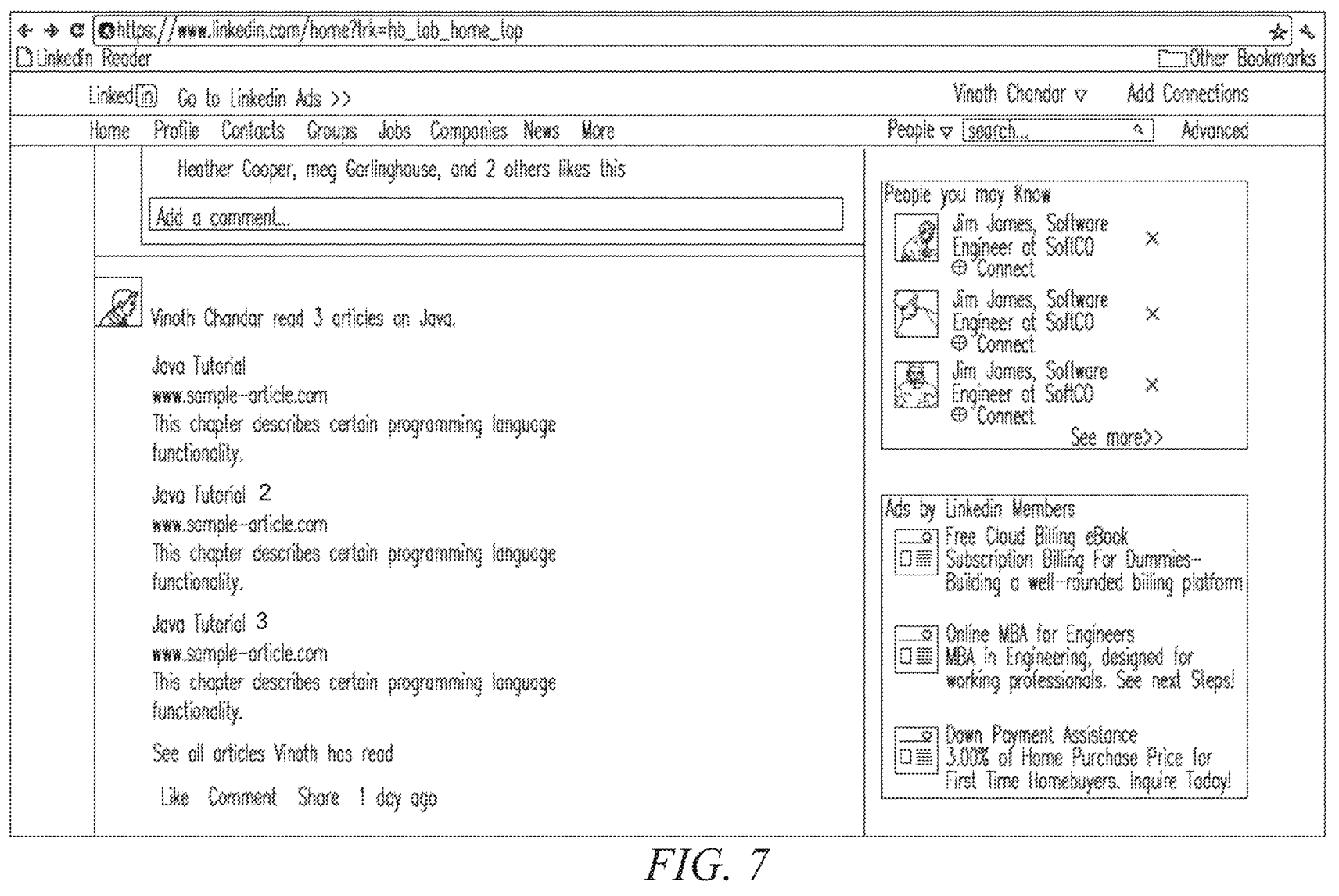

FIG. 7 shows a screenshot of an example bookmark feed in which recent content items that have been bookmarked by members is displayed. This may be for the member's own benefit, or may be visible by other members.

These examples can be combined in any permutation or combination. This overview is intended to provide an overview of subject matter of the present patent application. It is not intended to provide an exclusive or exhaustive explanation of the invention. The detailed description is included to provide further information about the present patent application.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
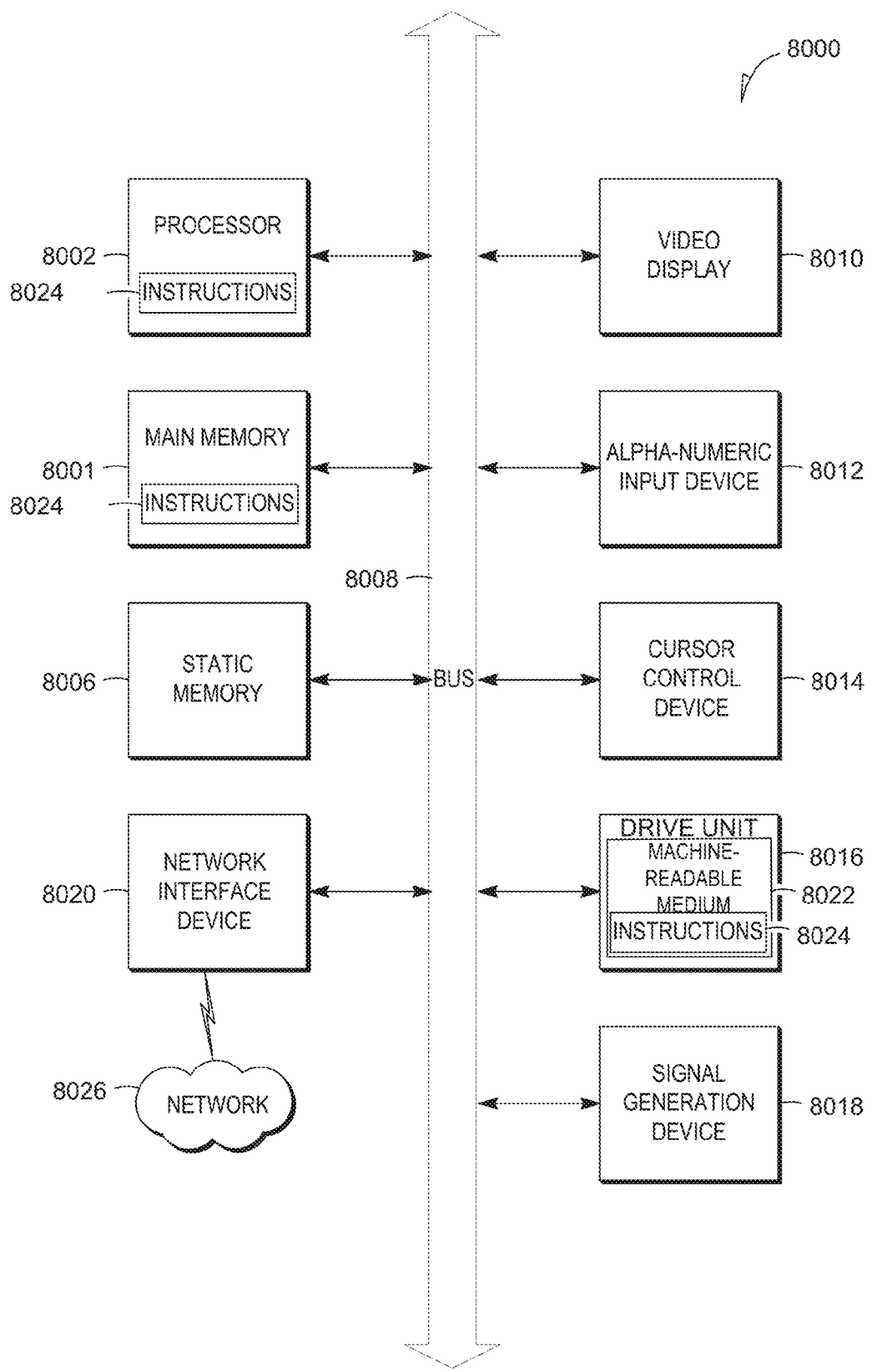
FIG. 8 shows a schematic of a machine according to some examples of the present disclosure.

FIG. 8 is a block diagram of machine in the example form of a computer system 8000 within which instructions, for causing the machine to perform any one or more of the methodologies discussed herein, may be executed. For example, the various components of FIG. 3 may be or contain one or more of the components described in FIG. 8. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a web appliance, a network router, switch or bridge, or any machine capable of executing instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 8 or only a subset of the components shown in FIG. 8.

The example computer system 8000 includes a processor 8002 (e.g., a central processing unit (CPU), a graphics processing unit (GPU) or both), a main memory 8004 and a static memory 8006, which communicate with each other via a bus 8008. The computer system 8000 may further include a video display unit 8010 (e.g., a liquid crystal display (LCD) or a cathode ray tube (CRT)). The computer system 8000 also includes an alphanumeric input device 8012 (e.g., a keyboard), a user interface (UI) navigation device 8014 (e.g., a mouse), a disk drive unit 8016, a signal generation device 8018 (e.g., a speaker) and a network interface device 8020.

Machine-Readable Medium

The disk drive unit 8016 includes a machine-readable medium 8022 on which is stored one or more sets of instructions and data structures (e.g., software) 8024 embodying or used by any one or more of the methodologies or functions described herein. The instructions 8024 may also reside, completely or at least partially, within the main memory 8004, static memory 8006, and/or within the processor 8002 during execution thereof by the computer system 8000, the main memory 8004 and the processor 8002 also constituting machine-readable media.

While the machine-readable medium 8022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 8024 may further be transmitted or received over a communications network 8026 using a transmission medium. The instructions 8024 may be transmitted using the network interface device 8020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 8020 may wirelessly transmit data and may include an antenna.

OTHER NOTES AND EXAMPLES

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Example 1

A method of providing a bookmarking service on a social networking service, the method including receiving, over a network, an indication that a member of the social networking service interacted with an item of content; associating the item of content with a skill using a computer processor; and storing an indication in a storage device that the member interacted with the item of content and the skill associated with the item of content.

Example 2

The method of example 1, including providing an interface to the member which presents information on the item of content and presents the associated skill.

Example 3

The method of any one of examples 1-2, comprising: receiving an indication that a second member of the social networking service interacted with a second item of content; associating the second item of content with the skill; determining that the member has not interacted with the second item of content; providing a recommendation to the member to interact with the second item of content.

Example 4

The method of any one of examples 1-3, comprising: increasing a skill rank of the member for the skill associated with the item of content.

Example 5

The method of any one of examples 1-4, wherein associating the item of content with a skill comprises: computing a term inverse document frequency for a plurality of terms in the item of content; comparing the term inverse document frequency for the plurality of terms in the item of content with a plurality of common terms associated with a plurality of standardized skills; calculating a probability that the document is associated with one of the plurality of skills, based upon the term inverse document frequency for the plurality of terms in the item of content and the plurality of common terms associated with the one of the plurality of skills.

Example 6

The method of any one of examples 1-5, comprising: receiving an indication from the member to recommend the item of content to a second member, the second member and the first member being connected; and presenting a recommendation to the second member.

Example 7

The method of any one of examples 1-6, comprising: storing information about the item of content along with the associated skill in the storage device.

Example 8

A system for providing a bookmarking service on a social networking service, the system comprising: a communications module configured to: receive, over a network, an indication that a member of the social networking service interacted with an item of content; and a content processing module configured to: associate the item of content with a skill using a computer processor; and store an indication in a storage device that the member interacted with the item of content and the skill associated with the item of content.

Example 9

The system of example 8, comprising a customization module configured to: provide an interface to the member which presents information on the item of content and presents the associated skill.

Example 10

The system of any one of examples 8-9, wherein the communications module is configured to: receive an indication that a second member of the social networking service interacted with a second item of content; the content processing module is configured to: associate the second item of content with the skill; and the system comprises a customization module configured to: determine that the member has not interacted with the second item of content; and provide a recommendation to the member to interact with the second item of content.

Example 11

The system of any one of examples 8-10, comprising a customization module configured to increase a skill rank of the member for the skill associated with the item of content.

Example 12

The system of any one of examples 8-11, wherein the content processing module is configured to associate the item of content with a skill by at least: computing a term inverse document frequency for a plurality of terms in the item of content; comparing the term inverse document frequency for the plurality of terms in the item of content with a plurality of common terms associated with a plurality of standardized skills; calculating a probability that the document is associated with one of the plurality of skills, based upon the term inverse document frequency for the plurality of terms in the item of content and the plurality of common terms associated with the one of the plurality of skills.

Example 13

The system of any one of examples 8-12, comprising a customization module configured to: receive an indication from the member to recommend the item of content to a second member, the second member and the first member being connected; and present a recommendation to the second member.

Example 14

The system of any one of examples 8-13, wherein the processing module is configured to: store information about the item of content along with the associated skill in the storage device.

Example 15

A machine readable medium that stores instructions which when performed by a machine, cause the machine to perform operations comprising: receiving, over a network, an indication that a member of a social networking service interacted with an item of content; associating the item of content with a skill using a computer processor; and storing an indication in a storage device that the member interacted with the item of content and the skill associated with the item of content.

Example 16

The machine readable medium of example 15, wherein the instructions comprise instructions which when performed by the machine, cause the machine to: provide an interface to the member which presents information on the item of content and presents the associated skill.

Example 17

The machine readable medium of any one of examples 15-16, wherein the instructions comprise instructions which when performed by the machine, cause the machine to: receive an indication that a second member of the social networking service interacted with a second item of content; associate the second item of content with the skill; determine that the member has not interacted with the second item of content; provide a recommendation to the member to interact with the second item of content.

Example 18

The machine readable medium of any one of examples 15-17, wherein the instructions comprise instructions which when performed by the machine, cause the machine to: increase a skill rank of the member for the skill associated with the item of content.

Example 19

The machine readable medium of any one of examples 15-18, wherein the instructions for associating the item of content with a skill comprise instructions which when performed by the machine cause the machine to: compute a term inverse document frequency for a plurality of terms in the item of content; compare the term inverse document frequency for the plurality of terms in the item of content with a plurality of common terms associated with a plurality of standardized skills; calculate a probability that the document is associated with one of the plurality of skills, based upon the term inverse document frequency for the plurality of terms in the item of content and the plurality of common terms associated with the one of the plurality of skills.

Example 20

The machine readable medium of any one of examples 15-19, wherein the instructions comprise instructions which when performed by the machine, cause the machine to: receive an indication from the member to recommend the item of content to a second member, the second member and the first member being connected; and present a recommendation to the second member.

Example 21

The machine readable medium of any one of examples 15-20, wherein the instructions comprise instructions which when performed by the machine, cause the machine to: store information about the item of content along with the associated skill in the storage device.

The claimed invention is:

1. A computer-implemented method for providing a bookmarking service integrated with a social networking service, the method comprising:
at a first computing device of the social networking service, using a computer processor:
receiving, over a communications network, from an application executing on a second computing device of a member of the social networking service, an indication that the member of the social networking service interacted with an item of content;
automatically analyzing the item of content to identify a skill corresponding to the item of content, the skill one of a plurality of standardized skills;
storing, in a storage device, the indication that the member interacted with the item of content and the indication of the skill associated with the item of content;
providing an interface to the member which presents information on the item of content and presents the skill; and
wherein analyzing the item of content to identify the skill comprises:
calculating term-inverse document frequency (tf-idf) scores for each of a plurality of terms in the item of content;
computing a set of terms for the item of content by selecting terms from the plurality of terms based upon their tf-idf scores; and
determining that the item of content is associated with the skill based upon a determination that at least a predetermined threshold number of the set of terms for the item of content matches terms from a plurality of terms associated with the skill.

2. The method of claim 1, comprising:
receiving an indication that a second member of the social networking service interacted with a second item of content;
associating the second item of content with the skill;
determining that the member has not interacted with the second item of content; and
providing a recommendation to the member to interact with the second item of content.

3. The method of claim 1, comprising:
increasing a skill rank of the member for the skill.

4. The method of claim 1, wherein the application executing on the second computing device provides the indication that the member of the social networking service interacted with the item of content by reviewing a web browser history of the member of the social networking service.

5. The method of claim 1, comprising:
receiving an indication from the member to recommend the item of content to a second member, the second member and the member being connected; and
presenting a recommendation of the item of content to the second member.

6. The method of claim 1, comprising:
storing information about the item of content along with the skill in the storage device.

7. A system for providing a bookmarking service integrated with a social networking service, the system comprising:
at least one processor;
a memory;
a set of instructions operable on the at least one processor to cause the at least one processor to perform operations to:
receive, over a communications network, from an application executing on a second computing device of a member of the social networking service, an indication that the member of the social networking service interacted with an item of content;
automatically analyzing the item of content to identify a skill corresponding to the item of content, the skill one of a plurality of standardized skills;
store, in a storage device, the indication that the member interacted with the item of content and the indication of the skill associated with the item of content;
provide an interface to the member which presents information on the item of content and presents the skill; and
wherein the operations to analyze the item of content to identify the skill comprises operations to:
calculate term-inverse document frequency (tf-idf) scores for each of a plurality of terms in the item of content;
compute a set of terms for the item of content by selecting terms from the plurality of terms based upon their tf-idf scores; and
determine that the item of content is associated with the skill based upon a determination that at least a predetermined threshold number of the set of terms for the item of content matches terms from a plurality of terms associated with the skill.

8. The system of claim 7, wherein the instructions further comprise instructions to cause the at least one processor to perform further operations to:
receive an indication that a second member of the social networking service interacted with a second item of content;
associate the second item of content with the skill;
determine that the member has not interacted with the second item of content; and
provide a recommendation to the member to interact with the second item of content.

9. The system of claim 7, wherein the instructions further comprise instructions to cause the at least one processor to perform further operations to:
increase a skill rank of the member for the skill.

10. The system of claim 7, wherein the application executing on the second computing device provides the indication that the member of the social networking service interacted with the item of content by reviewing a web browser history of the member of the social networking service.

11. The system of claim 7, wherein the instructions further comprise instructions to cause the at least one processor to perform further operations to:
receive an indication from the member to recommend the item of content to a second member, the second member and the member being connected; and
present a recommendation of the item of content to the second member.

12. The system of claim 7, wherein the instructions further comprise instructions to cause the at least one processor to perform further operations to:
store information about the item of content along with the skill in the storage device.

13. A non-transitory machine readable medium that stores instructions which when performed by a machine, cause the machine to perform operations to:
receive, over a communications network, from an application executing on a second computing device of a member an indication that the member of a social networking service interacted with an item of content;
automatically analyzing the item of content with to identify a skill corresponding to the item of content, the skill one of a plurality of standardized skills;
store the indication in a storage device that the member interacted with the item of content and the indication of the skill associated with the item of content; provide an interface to the member which presents information on the item of content and presents the skill; and
wherein the operations to analyze the item of content to identify the skill comprises operations to:
calculate term-inverse document frequency (tf-idf) scores for each of a plurality of terms in the item of content;
compute a set of terms for the item of content by selecting terms from the plurality of terms based upon their tf-idf scores; and
determine that the item of content is associated with the skill based upon a determination that at least a predetermined threshold number of the set of terms for the item of content matches terms from a plurality of terms associated with the skill.

14. The machine readable medium of claim 13, wherein the operations comprise operations to:
receive an indication that a second member of the social networking service interacted with a second item of content;
associate the second item of content with the skill;
determine that the member has not interacted with the second item of content; and
provide a recommendation to the member to interact with the second item of content.

15. The machine readable medium of claim 13, wherein the operations comprise operations to:
increase a skill rank of the member for the skill.

16. The machine readable medium of claim 13, wherein the application executing on the second computing device provides the indication that the member of the social networking service interacted with the item of content by reviewing a web browser history of the member of the social networking service.

17. The machine readable medium of claim 13, wherein the operations comprise operations to:
receive an indication from the member to recommend the item of content to a second member, the second member and the member being connected; and
present a recommendation of the item of content to the second member.

18. The machine readable medium of claim 13, wherein the operations comprise operations to:
store information about the item of content along with the skill in the storage device.

* * * * *

UNITED STATES PATENT AND TRADEMARK OFFICE
CERTIFICATE OF CORRECTION

| | |
|---|---|
| PATENT NO. | : 9,769,270 B2 |
| APPLICATION NO. | : 14/623694 |
| DATED | : September 19, 2017 |
| INVENTOR(S) | : Vinoth Chandar |

Page 1 of 1

It is certified that error appears in the above-identified patent and that said Letters Patent is hereby corrected as shown below:

On the Title Page

On page 2, in Column 2, item (56), under "Other Publications", Line 11, delete "Porfessional" and insert --Professional-- therefor In the Claims In Column 19, Line 24, in Claim 13, after "content", delete "with"

In Column 19, Line 29, in Claim 13, after "content;", insert --¶--

Signed and Sealed this
Twenty-eighth Day of April, 2020

Andrei Iancu
*Director of the United States Patent and Trademark Office*